United States Patent [19]
Lendaro

[11] Patent Number: 4,761,723
[45] Date of Patent: Aug. 2, 1988

[54] POWER SUPPLY REGULATOR FOR TELEVISION

[75] Inventor: Jeffery B. Lendaro, Noblesville, Ind.

[73] Assignee: RCA Licensing Corporation, Princeton, N.J.

[21] Appl. No.: 19,855

[22] Filed: Feb. 27, 1987

[51] Int. Cl.$^4$ .................... H02M 3/335; H01J 29/70; H04N 3/18

[52] U.S. Cl. .................... 363/21; 363/49; 358/190; 315/411

[58] Field of Search .................... 363/21, 49, 56, 97; 358/188, 190; 315/411

[56] References Cited

U.S. PATENT DOCUMENTS

| | | | |
|---|---|---|---|
| 4,392,090 | 7/1983 | Rinehart et al. | 315/411 |
| 4,500,923 | 2/1985 | Duvall et al. | 315/411 X |
| 4,532,457 | 7/1985 | Haferl | 315/411 |
| 4,651,214 | 3/1987 | Rodriguez-Cavazos | 358/190 |
| 4,656,399 | 4/1987 | Testin et al. | 315/411 |

OTHER PUBLICATIONS

A Service Manual entitled Color Television Basic Service Data for RCA television chassis CTC 111 series, published by RCA Corporation, Consumer Electronics, Indianapolis, Indiana, dated 1981.

Primary Examiner—Patrick R. Salce
Assistant Examiner—Emanuel T. Voeltz
Attorney, Agent, or Firm—Eugene M. Whitacre; Joseph J. Laks; Sammy S. Henig

[57] ABSTRACT

A first run supply voltage is generated, during a power-up mode of a television receiver power supply, by rectifying a retrace voltage in a flyback transformer of a horizontal output stage of the television receiver. The rectified voltage is coupled through a resistor and a diode to a power supply voltage receiving terminal of an integrated circuit that generates a horizontal rate drive signal. The drive signal provides switching timings to the output stage. A standby supply voltage is coupled, during a standby mode, to the terminal. A shunt regulator regulates the voltage at the terminal during both the power-up and standby modes. A transistor having a collector electrode that is coupled to the run supply voltage and a base electrode, that is coupled to the anode of the diode, generates a second run supply voltage that is temperature compensated at an emitter electrode of the transistor.

20 Claims, 1 Drawing Sheet

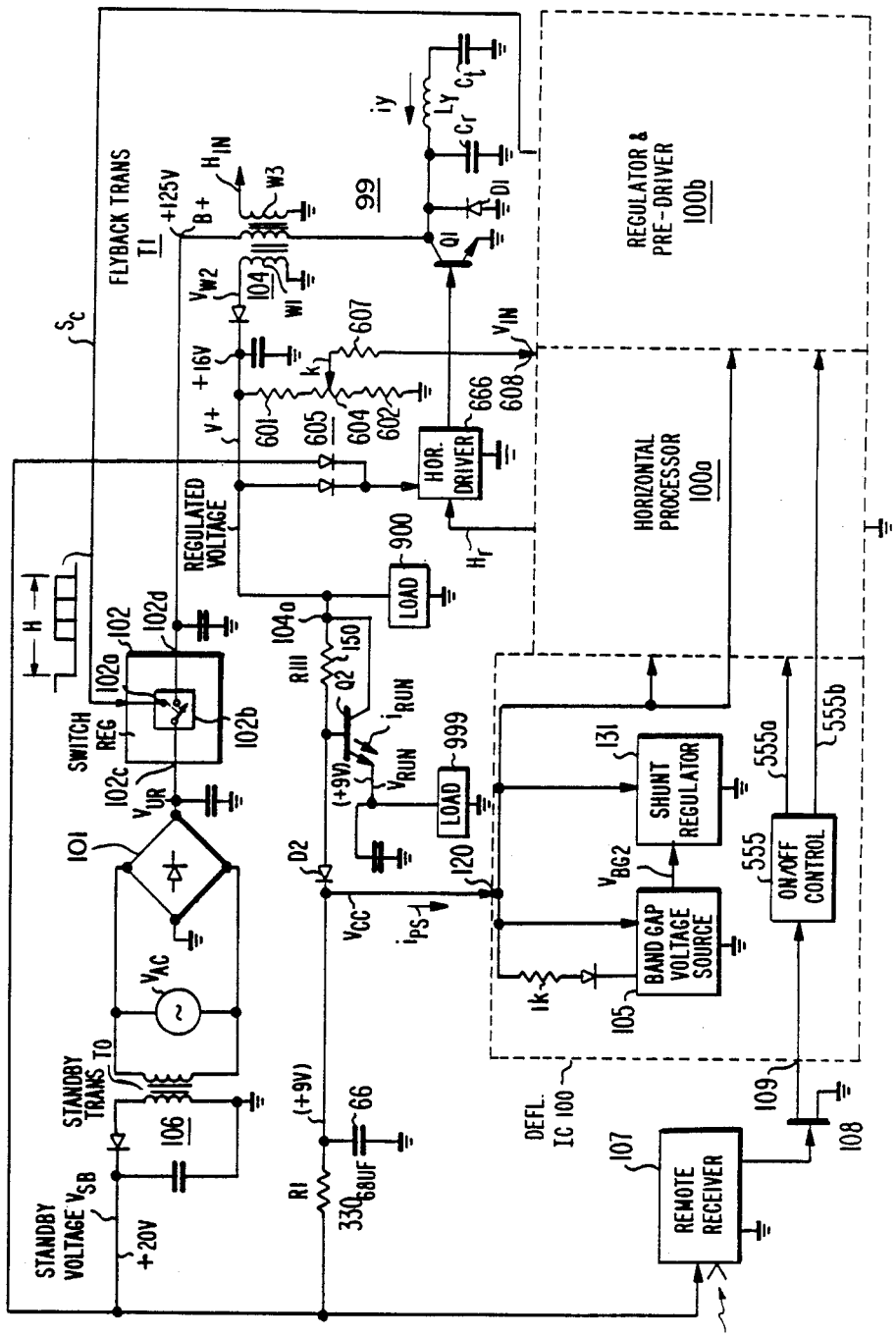

POWER SUPPLY REGULATOR FOR TELEVISION

The invention relates to an arrangement for regulating a run supply voltage of a telvision apparatus.

In, for example, a television reciever, a pulse-width modulator, or voltage regulator may generate a pulse-wwidth modulated control signal, at a horizontal deflection related frequency. The control signal may be coupled to a power supply switching stag that supplies a regulated B+ supply voltge to a horizontal output stage. The voltage regulator circuitry may be combind with horizontal circuit (IC) that is referred to herein as the deflction IC. The deflection IC may be required to operate, selectively, in a power-up mode and in a standby mode, in accordance with an on/off control signal provided by a remote rceiver. Such pulse-width voltage regulator may be required to supply, in the power-up mode, the pulse-width modulated control signal for controlling the powr supply that generates the regulated B+ supply voltage used for operating the horizontal output stage of the receiver. When opertion in the standby mode is required, such control signalmay be required to prevent the power supply from energizing the deflection output stage until such time as a user initiates a power-up command that is provided via the remote receiver.

The deflection IC that includes, for example, the voltage regulator, may include other portions that are required to be energized during both the power-up and the standby modes. A second voltage regulator such as a shunt regulator integral to the IC, for example, may be coupled betwen a supply voltage receiving terminal of the deflection IC and ground for regulating the supply voltag of the deflection IC during both the power-up and tandby modes. similarly, the remote receiver may also be required to be energized during both the power-up mode and the standby mode.

A standby power supply for the deflection IC may include a tandby transformer having a primary winding that is coupled to an alternating current (AC) mains supply source. A voltage that is developed at a secondary winding of the transformer may be rectified to produce a DC, standby energizing voltage. The standby energizing voltage may be applied to the supply voltage receiving terminal of the deflection IC to energize, for example, that portion of the deflection IC that is required to be energized by the standby power supply during the standby mode; whereas, during the power-up mode, the run-mode power supply provides the energizing voltage to such terminal. The shunt regulator may regulate the energizing voltage at such terminal during both the power-up and tandby modes.

The regulated, energizing voltag, developed at the supply voltage receiving terminal during the power-up mode, may be at, for example, the same level that is required by other integrated circuits of the television receiver. Therefore, it may be desirable to utilize such regulatd energizing voltage to regulate a second supply voltage that is coupled to various other circuits of the television receiver and that provides a corresponding supply current during operation in the power-up mode.

It may be desirble toobtain such regulation of the second supply voltage with as few circuit components as possible. Furthermore, it may be desirable that, during operation in the standby mode, the second supply voltage generating and regulating circuitry will not load the standby powr supply that is coupled to the supply voltage rceiving terminal of the deflection IC. Reduction of the supply current that is required from the tnadby transformer during the standby mode is desirable so as to reduc the cost of such transformer.

In accordance with an aspect of the invention, a television apparatus power supply generates a first supply voltage during a normal operation power-up mode of the power supply. a second supply voltage is coupled to a first terminal of a first load circuit to develop a first terminal supply voltage prior to operation in the power-up mode. A switching arrangement is coupled between the first supply voltage and the first terminal for coupling, during the power-up mod, the first supply voltage to the first terminal to develop, during the power-up mode, the first terminal supply voltage at the first terminal. A voltage regulator supply voltag such that the regulated first terminal supply voltage is coupled through the switching arrangement, during the power-up mode, to a second terminal of the switching arrangement to regulate at the second terminal a third supply voltage that, prior to the operation in the power-up mode, is isolated by the switching arrangment from the first terminal.

The sole FIGURE illustrates a television power supply including a supply regulator embodying the invention.

The sole FIGURE illustrates a portion of a television reciever incorporating a deflection IC 100. Such portion of the television receiver includes a bridge rectifier 101 that rectifies a mains supply voltage $V_{AC}$ to produce a DC, unregulated voltage $V_{UR}$. A conventionally designed output stage, or switch regulator 102 that may include a silicon controlled rectifier (SCR) produces, in a power-up mode, a regulated voltage B+ that is coupled to a flyback transformer T1. An input terminal 102c of regulator 102 is coupled to unregulated voltage $V_{UR}$. Regulated voltage B+ is developed at an output terminal 102d of switch regulator 102. Transformer T1 is coupled to a collector electrode of a deflection switching transistor Q1 of a horizontal circuit output stage 99 operating at a horizontal rate $f_H$. A control signal $H_r$, at the horizontal rate $f_H$, that is produced in a corresponding portion of deflection IC 100, referred to herein as a horizontal processor 100a, is coupled via a horizontal driver 666 to the base electrode of transistor Q1. Signal $H_r$ controls the switching of transistor Q1 to generate a deflection current $i_y$ in a deflection winding $L_Y$ of output stage 99. A retrace voltage $V_{w2}$ is produced in a conventional manner across a winding W1 of transofrmer T1 in each retrace interval of each horizontal period H. Each retrace interval occurs immediately after transistor Q1 becomes nonconductive. A DC, run-mode supply voltage V+, that is illustratively +16 volts, is produced by rectifying voltage $V_{w2}$ in a rectifier arrangement 104 that is coupled to winding W1. Voltage V+ is also coupled to various circuits of the receiver to provide them with energy during a power-up mode of the television receiver. Such circuits are depicted as a load 900.

Voltage V+ is also coupled to a corresponding portion of deflection IC 100 that is referred to herein as switch mode regulator and pre-driver 100b to provide a feedback signal. Regulator and pre-driver 100b generates a pulse width modulated signal $S_c$ that controls the duration, in each horizontal interval H, in which switch regulator 102 is conductive. The duty cycle of signal $S_c$ varies, in accordance with a difference between a voltage that is proportional to voltage V+ and a reference voltage $V_{NIN}$ that may be produced in a conventional manner. Signal $S_c$ causes regulated voltage B+ to be at a predetermined DC voltage level such as, illustratively, +125 volts. Signal $S_c$, voltage B+ and voltage kV+ that may be produced in a conventionally known manner are produced, illustratively, when deflection IC 100 operates in the power-up mode, but are not produced during television receiver standby-mode operation.

A standby transformer TO steps down voltage $V_{AC}$. The stepped down voltage is rectified in a rectifier arrangement 106 to produce a standby voltage $V_{SB}$. Standby voltage $V_{SB}$ is coupled to an energizing voltage receiving terminal 120 of deflection IC 100 through a resistor R1 that charges a capacitor 66 to produce in capacitor 66 an energizing voltage $V_{cc}$. Voltage $V_{cc}$ is coupled to terminal 120 of deflection IC 100. Regulated voltage V+ is coupled to terminal 120 via a resistor R11, that is coupled in series with a diode D2, to supply voltage $V_{cc}$ from voltage V+ only when deflectin IC 100 operates in the power-up mode. Diode D2 that is nonconductive during the standby mode prevents current drain via load 900 from standby transformer TO.

Standby voltage $V_{SB}$ is coupled to a remote receiver 107 to provide the operating voltage of remote receiver 107. Remote receiver 107 causes, via a drain of an MOS transistor 108, when transistor 108 is conductive, a a low impedance to be formed at a terminal 109 of deflection IC 100. The low impedance occurs after, for example, a user initiates a power-on command via an infrared communication link that cuases a start-up interval to occur. When transistor 108 becomes conductive, it causes an on/off control circuit 555 to generate a control signal 555a that applies voltage $V_{cc}$ to horizontal processor 100a; consequently, a horizontal oscillator, not shown in the FIGURES, of processor 100a begins operating and signal $H_r$ is generated. Similarly, a control signal 555b of circuit 555 applies voltage $V_{cc}$ to pre-driver 100b that causes pre-driver 100b to generate signal $S_c$.

At the beginning of the start-up interval, horizontal driver 666 is energized by standby voltage $V_{SB}$. Voltage $V_{cc}$ is then obtained from the charge previously stored by arrangement 106 in capacitor 66. During the start-up interval, voltage V+ that was zero before begins increasing. At the end of the start-up interval, when voltage V+ is sufficiently large, it causes diode D2 to turn-on for supplying voltage $V_{cc}$ in the power-up mode from voltage V+.

In the power-up mode, the television receiver is fully operative. Conversely, after a power-off command is initiated by the user, transistor 108 becomes nonconductive and forms a high impedance circuit at terminal 109 that causes a standby mode to occur. In the standby mode, deflection current $i_y$ and the raster on a display device of the television receiver are turned-off.

An input supply current $i_{PS}$ is coupled through terminal 120 to deflection IC 100 for providing the energizing current of deflection IC 100. During operation in the power-up mode, current $i_{PS}$ is suppliled mainly by rectifier arrangement 104 through diode D2 and D4; whereas, during operation in the standby mode, current $i_{PS}$ is supplied from standby transformer 106 via rectifier arrangement 106 and resistor R1.

Voltage $V_{cc}$ is regulated in deflection IC 100 by a shunt regulator 131 that is required to regulate voltage $V_{cc}$ during operations in both the standby mode and the power-up mode. Regulation of voltage $V_{cc}$ during the standby mode may be desirable for protecting deflection IC 100 from an over-voltage condition at terminal 120 that may occur should voltage $V_{cc}$ exceed the voltage rating of deflection IC 100, during the standby mode. If permitted to occur, such over voltage condition may damage deflection IC 100. Voltage $V_{cc}$ may also be required to be a regulated voltage, during the standby mode, for operating, for example, on/off control circuit 555 of deflection IC 100. Shunt regulator 131 regulates voltage $V_{cc}$, in accordance with a reference voltage $V_{BG2}$, that is generated during both the power-up and standby modes. Voltage $V_{BG2}$ is generated in, for example, in a bandgap type voltage source 105 that is, therefore, required to operate during both the standby and the power-up modes.

Various circuits in the receiver such as, for example, a second IC of the television reciver, that are depicted as a load 999 in the FIGURE, may require, during the power-up mode, a regulated supply voltage, that is depicted as a voltage $V_{RUN}$ in the FIGURE. Voltage $V_{RUN}$ may be required to be at a level that is equal to that of, for example, voltage $V_{cc}$. It may be desirable to utilize voltage $V_{cc}$ that is regulated by shunt regulator 131 to also provide regulation of voltage $V_{RUN}$.

In accordance with an aspect of the invention, a transistor Q2 having a collector electrode that is coupled to voltage V+ at a terminal 104a produces regulated voltage $V_{RUN}$ at a emitter electrode of transistor Q2. The base electrode of transistor Q2 is ocupled to the anode of diode D2. The base current of transistor Q2 is provided by resistor R111. The forward voltage drop across diode D2 is summed with voltage $V_{cc}$ to produce at the base of transistor Q2 a voltage that is higher by diode D2 voltage drop that is, approximately, 0.7 volts in a silicon diode. Consequently, voltage $V_{RUN}$ that is smaller than the base voltage of transistor Q2 by, approximately, the same voltage drop that is developed across diode D2 is equal to voltage $V_{cc}$. A current $i_{RUN}$ that is supplied via transistor Q2 to load 999 is outside the current path of current $i_{PS}$ that is coupled to deflection IC 100 via terminal 120.

In accordance with another aspect of the invention, temperature related changes of the voltage across the base-emitter junction of transistor Q2, are temperature compensated by diode D2 to render voltage $V_{RUN}$ regulated and temperature compensated. Furthermore, using a bandgap type voltage source such as source 105 for regulating voltage $V_{RUN}$ provides, advantageously, temperature compensation with tighter tolerances than obtained by using a zener diode that is used in some prior art circuits. Also, unlike a zener diode, the bandgap type voltage source can be designed to provide any selected voltage within a given range of voltages. Using resistor R111, diode D2 and shunt regulator 131, that are used for operating deflection IC 100, also for controlling transistor Q2 to obtain regulation of voltage $V_{RUN}$, advantageously, eliminates the need for separate resistor, diode and regulator that would have, otherwise, been required for providing the base voltage of transistor Q2.

During operation in the power-up mode, voltage V+, that is ocupled via resistor R111, causes diode D2 to be conductive. Resistor R111 is required to developing a voltage drop that is equal to the difference between voltage V+ and a sum voltage of voltage $V_{cc}$ and the forward voltage drop across diode D2.

During the standby mode it is undesirable to load transformer TO and capacitor 66 by any of load 900, load 999, resistor R111 and transistor Q2, because the cost of transformer TO is directly related to the standby current requirement from, or loading of, transformer TO. Diode D2, advantageously, prevents the loading of transformer TO during the start-up interval, as long as voltage V+ is not sufficiently large to turn on diode D2. Similarly, during the standby mode, each of load 900, load 999, resistor R111 and transistor Q2 is, advantageously, isolated from standby transformer TO by diode D2 that is switched off.

What is claimed:

1. A television apparatus power supply, comprising:
   a source of an input supply voltage;
   a source of an on/off control signal that selectively contains power-on and power-off control information that is indicative when an operation of said power supply in a normal operation power-up mode is required and when in a standby mode is required, respectively;
   means responsive to said on/off control signal and coupled to said input supply voltage for generating therefrom a first supply voltage during a normal operation power-up mode of said power supply;
   means coupled to said input supply voltage for generating therefrom a second supply voltage that is coupled to a first terminal of a first load circuit to develop thereat a first terminal supply voltage during said standby mode;
   switching means coupled between said first supply voltage and said first terminal for coupling during said power-up mode said first supply voltage to said first terminal to develop during said power-up mode said first terminal supply voltage at said first terminal; and
   a voltage regulator coupled to said first terminal for regulating said first terminal supply voltage such that said regulated first terminal supply voltage is coupled through said switching means during said power-up mode to a second terminal of said switching means to regulate thereat a third supply voltage that during said standby mode is isolated by said switching means from said first terminal.

2. An apparatus according to claim 1 wherein said switching means comprises a diode.

3. An apparatus according to claim 1 further comprising, a transistor having a control electrode that is coupled to said third supply voltage at said second terminal, wherein a second load circuit is coupled to a main current conducting electrode of said transistor and wherein said switching means comprises a diode that is interposed between said control electrode of said transistor and said forst terminal supply voltage and a resistor coupled between said diode and said first supply voltage that cuases said diode to be conductive only when said first supply voltage is generated.

4. An apparatus according to claim 3 wherein said diode isolates said first supply voltage generating means from said second supply voltage during said standby mode.

5. An apparatus according to claim 4 wherein said diode isolates said first supply voltage generating means from said second load during said standby mode when said first supply voltage is turned-off.

6. An apparatus according to claim 3 wherein said diode provides temperature compensation for variations of a base-emitter junction voltage in said transistor to produce a temperature compensated output supply voltage at an emitter electrode of said transistor.

7. An apparatus according to claim 1 wherein said first supply voltage generating means comprises a deflection circuit, responsive to a control signal at a frequency that is related to a deflection frequency, that includes a flyback transformer for producing, when said signal at said deflection related frequency is generated, said first supply voltage from a voltage that is developed at said flyback transformer and wherein said regulated first terminal supply voltage is coupled to a control circuit that generates said control signal at said deflection related frequency for energizing said control circuit.

8. An apparatus according to claim 7 wherein said control circuit generates said control signal that is a pulse-width modulated control signal.

9. An apparatus according to claim 1 wherein said second supply voltage generating means comprises a step-down transformer coupled to said input supply voltage, and a rectifier having an input terminal that is coupled to said step-down transformer for generating said second supply voltage by rectifying a voltage that is developed at said step-down transformer.

10. An apparatus according to claim 1 wherein said first supply voltage generating means comprises a deflection circuit having a flyback transformer for generating in a winding of said flyback transformer a voltage at a frequency that is related to a deflection frequency and a rectifier coupled to said winding of said flyback transformer for generating from a voltage that is generated in said winding said first supply voltage.

11. An apparatus according to claim 1 wherein said source of said on/off control signal comprises a remote receiver.

12. An apparatus according to claim 1 further comprising a third load circuit coupled to said first supply voltage generating means wherein said switching means isolates said first terminal from said third load circuit during said standby mode.

13. A television apparatus power supply, comprising:
    a source of a start-up supply voltage;
    a run-mode power supply for developing in a run-mode a run-supply voltage, said run-mode power supply having a first terminal that is coupled to said start-up supply voltage for developing a first terminal supply voltage at said first terminal during a start-up interval;
    switching means coupled to said first terminal and to said source of run-supply voltage for applying said run supply voltage to said first terminal to develop said first terminal supply voltage at said terminal during operation in said run-mode; and
    an emitter follower stage having an input terminal that is coupled to said first terminal via said switching means during said run-mode and having an output terminal coupled to a load and a third terminal that is coupled to said source of run supply voltage for supplying main current from said output terminal to said load during operation in said run-mode at an applied voltage level that is regulated in accordance with said first terminal supply voltage.

14. A television apparatus power supply, comprising:
    a source of an input supply voltage;
    means coupled to said input supply voltage for generating therefrom a first supply voltage during a normal operation power-up mode of said power supply;

means coupled to said input supply voltage for generating therefrom a second supply voltage that is coupled to a first terminal of a first load circuit to develop thereat a first terminal supply voltage prior to the operation in said power-up mode;

switching means coupled between said first supply voltage and said first terminal for coupling during said power-up mode said first supply voltage to said first terminal to develop during said power-up mode said first terminal supply voltage at said first terminal; and a voltage regulator coupled to said first terminal for regulating said first terminal supply voltage such that said regulated first terminal supply voltage is coupled through said switching means during said power-up mode to a second terminal of said switching means to regulate thereat a third supply voltage that prior to the operation in said power-up mode is isolated by said switching means from said first terminal.

15. An apparatus according to claim 1 wherein said switching means comprises a diode.

16. An apparatus according to claim 14 further comprising, a transistor having a control electrode that is coupled to said third supply voltage at said second terminal, wherein a second load circuit is coupled to a main current conducting electrode of said transistor and wherein said switching means comprises a diode that is interposed between said control electrode of said transistor and said first terminal supply voltage and a resistor coupled between said diode and said first supply voltage that causes said diode to be conductive only when said first supply voltage is generated.

17. An apparatus according to claim 16 wherein said diode isolates said first supply voltage generating meand from said second supply voltage during a standby mode of operation.

18. An apparatus according to claim 17 wherein said diode isolates said first supply voltage generating means from said second load during said standby mode when said first supply voltage is turned-off.

19. An apparatus according to claim 16 wherein said diode provides temperature compensation for variations of a base-emitter junction voltage in said transistor to produce a temperature compensated output supply voltage at an emitter electrode of said transistor.

20. An apparatus according to claim 14 wherein said first supply voltage generating means comprises a deflection circuit, responsive to a control signal at a frequency that is related to a deflection frequency, that includes a flyback transformer for producing, when said signal at said deflection related frequency is generated, said first supply voltage from a voltage that is developed at said flyback transformer and wherein said regulated first terminal supply voltage is coupled to a control circuit that generates said control signal at said deflection related frquency for energizing said control circuit.

* * * * *

UNITED STATES PATENT AND TRADEMARK OFFICE
CERTIFICATE OF CORRECTION

PATENT NO. : 4,761,723

DATED : August 24, 1988

INVENTOR(S): Jeffery B. Lendaro

It is certified that error appears in the above-identified patent and that said Letters Patent is hereby corrected as shown below:

Column 1, line 8, that portion reading "wwidth" should read--width--; line 10, that portion reading "stag" should read--stage--; line 11, that portion reading "voltag" should read--voltage--; line 12, that portion reading "combind" should read --combined--; line 13, after "horizontal" and before "circuit" insert--deflection circuitry and incorporated in an integrated --; line 14, that portion reading "deflction" should read--deflection--; line 17, that portion reading "rceiver" should read--receiver--; line 19, that portion reading "powr" should read--power--; line 23, that portion reading "signalmay" should read--signal may--; line 35, that portion reading "voltag" should read--voltage--; line 36, that portion reading "tandby" should read--standby--; line 36, that portion reading "similarly" should read--Similarly--; line 40, that portion reading "tandby" should read--standby--; line 53, that portion reading "tandby" should read--standby--; line 54, that portion reading "voltag" should read--voltage--; line 59, that portion reading "regulatd" should read--regulated--; line 63, that portion reading "toobtain" should read--to obtain--; line 68, that portion reading "powr" should read--power--; Column 2, line 3, that portion reading "tnadby" should read--standby--; line 8, that portion reading "a" should read--A--; line 13, that portion reading "mod" should read--mode--; line 16, after "regulator" and before "supply" insert--coupled to the first terminal regula regulates the first terminal--; line 16, that portion reading "voltag" should read--voltage--; Column 3, line 5, that portion reading "kV+" should read--V+--; Column 4, line 29, that portion reading "ocupled" should read--coupled--; Column 5, line 52, that portion reading "forst" should read--first--; line 54, that portion reading "cuases" should read causes--; Column 6, line 51, after"said" and before "terminal" insert--first--;

UNITED STATES PATENT AND TRADEMARK OFFICE
CERTIFICATE OF CORRECTION

PATENT NO. : 4,761,723
DATED : August 24, 1988
INVENTOR(S) : Jeffery B. Lendaro

It is certified that error appears in the above-identified patent and that said Letters Patent is hereby corrected as shown below:

Column 8, line 7, that portion reading "meand" should read --means--; line 28, that portion reading "frquency" should read --frequency--.

Signed and Sealed this

Twentieth Day of December, 1988

Attest:

DONALD J. QUIGG

Attesting Officer

Commissioner of Patents and Trademarks